United States Patent
Ji et al.

(10) Patent No.: US 11,588,915 B2
(45) Date of Patent: Feb. 21, 2023

(54) METHOD AND SYSTEM OF PUSHING VIDEO VIEWFINDER

(71) Applicant: Shanghai Bilibili Technology Co., Ltd., Shanghai (CN)

(72) Inventors: Yunjie Ji, Shanghai (CN); Yongcheng Dai, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/325,520

(22) Filed: May 20, 2021

(65) Prior Publication Data
US 2021/0368017 A1    Nov. 25, 2021

(30) Foreign Application Priority Data
May 22, 2020  (CN) .................. 202010442976.X

(51) Int. Cl.
| | |
|---|---|
| H04L 29/08 | (2006.01) |
| G06K 9/00 | (2022.01) |
| G11B 27/34 | (2006.01) |
| G11B 27/10 | (2006.01) |
| G06F 3/0484 | (2022.01) |
| H04N 21/258 | (2011.01) |
| H04N 21/234 | (2011.01) |
| G06F 16/78 | (2019.01) |
| G06F 16/787 | (2019.01) |
| H04L 67/55 | (2022.01) |
| G06F 3/04842 | (2022.01) |
| G06V 20/40 | (2022.01) |

(52) U.S. Cl.
CPC .......... *H04L 67/55* (2022.05); *G06F 3/04842* (2013.01); *G06F 16/787* (2019.01); *G06F 16/7867* (2019.01); *G06V 20/46* (2022.01); *G06V 20/48* (2022.01); *H04N 21/234* (2013.01); *H04N 21/25841* (2013.01)

(58) Field of Classification Search
CPC ... H04L 67/55; G06F 16/7867; G06F 16/787; G06F 3/04842; G06V 20/46; G06V 20/48
See application file for complete search history.

(56) References Cited

U.S. PATENT DOCUMENTS

| | | | |
|---|---|---|---|
| 8,315,423 B1 * | 11/2012 | Jing ................... | G06Q 30/0261 382/181 |
| 8,593,485 B1 * | 11/2013 | Anguelov .............. | G09G 5/377 345/619 |

(Continued)

*Primary Examiner* — Sang H Kim
(74) *Attorney, Agent, or Firm* — BakerHostetler

(57) ABSTRACT

The present disclosure describes techniques of pushing information associated with the at least one location that is associated with a video. The disclosed techniques comprises obtaining video data, wherein the video data comprise a plurality frames of a video and information associated with the video; determining at least one location associated with at least one frame among the plurality of frames of the video based on comparing the video data with data included in a database; determining information associated with the at least one location; and pushing the information associated with the at least one location to a first computing device based on a time point of playing the at least one frame among the plurality of frames of the video.

18 Claims, 6 Drawing Sheets

(56) References Cited

U.S. PATENT DOCUMENTS

| | | | | |
|---|---|---|---|---|
| 2006/0026628 | A1* | 2/2006 | Wan | H04N 5/2723 375/240.26 |
| 2009/0216691 | A1* | 8/2009 | Borzestowski | G06F 16/3332 715/706 |
| 2010/0306193 | A1* | 12/2010 | Pereira | G06F 16/7328 707/E17.014 |
| 2012/0330669 | A1* | 12/2012 | Narayanan | G10L 21/06 704/271 |
| 2014/0003501 | A1* | 1/2014 | Soroushian | G06F 16/73 375/E7.243 |
| 2018/0157915 | A1* | 6/2018 | Sherry | G06V 20/52 |
| 2022/0004771 | A1* | 1/2022 | Grancharov | G06K 9/6256 |

* cited by examiner

METHOD AND SYSTEM OF PUSHING VIDEO VIEWFINDER

CROSS-REFERENCE TO RELATED APPLICATION

The present application claims priority of Chinese Patent Application No. CN 202010442976.X, filed on May 22, 2020, entitled "Method and system of pushing video viewfinder". Entire content of the Chinese patent application is incorporated in the present application by reference.

BACKGROUND

A viewfinder (also known as the "holy land" associated with a video) that appears in a video work, includes an actual shooting location in the film and television shooting works, or an actual location with high similarity in animation and game works that the producer takes. Wherein, the video work includes but is not limited to TV series, variety shows, documentaries, animations, user-made videos and so on.

SUMMARY

The purpose of embodiments of the present application is to provide a method and system of pushing video viewfinder, electronic device and computer-readable storage medium, aiming to solve the problem of how to associate a video work with a viewfinder appearing in the video work and push the viewfinder to users in time.

In order to achieve above purpose, the embodiments of the present application provide a method of pushing video viewfinder, the method including: obtaining video data, wherein the video data comprise a plurality frames of a video and information associated with the video; determining at least one location associated with at least one frame among the plurality of frames of the video based on comparing the video data with data included in a database; determining information associated with the at least one location; and pushing the information associated with the at least one location to a first computing device based on a time point of playing the at least one frame among the plurality of frames of the video.

In order to achieve above purpose, the embodiments of the present application provide an electronic device, which includes a memory, a processor, and programs of pushing video viewfinder that stored in the memory and are operable on the processor, wherein when the programs of pushing video viewfinder are executed by the processor, the method of pushing video viewfinder above is implemented.

In order to achieve above purpose, the embodiments of the present application provide a computer-readable storage medium, which stores programs of pushing video viewfinder that can be executed by a processor to implement the method of pushing video viewfinder above.

DETAILED DESCRIPTION OF ILLUSTRATIVE EMBODIMENTS

In the prior art, there is no effective way for users to push the viewfinder that appears in the video. It mainly relies on some users to actively discover the viewfinder and promote the viewfinder to other users in bullet screen, comments, or other community platforms. That is to say, the existing video products lack the association with the viewfinder appearing in the video work, that is, the user cannot quickly and conveniently learn the actual location of the viewfinder appearing in the video when watching the video work in a single video product or after watching, which increases the obstacles for users to travel to commemorate and explore on the spot, and affects the user's experience.

The techniques described in the present disclosure associate videos with actual viewfinders configured for locations associated with the videos and including information associated with the locations as well as time points of pushing the information associated with the locations to client computing devices, and clearly mark the viewfinder information at a corresponding time point in a video playing page, so that the user can query related information, thereby increasing an online discovery rate of these offline viewfinders and improving user's experience.

In order to make the purpose, technical solutions, and advantages of the present application clearer, the following further describes the present application in detail with reference to the accompanying drawings and embodiments. It should be understood that the specific embodiments described here are only used to explain the present application, and not used to limit the present application. Based on the embodiments in the present application, all other embodiments obtained by those of ordinary skills in the art without creative work are falling within the protection scope of the present application.

It should be noted that the descriptions related to "first", "second" and so on in the embodiments of the present application are only for descriptive purposes, and cannot be understood as indicating or implying their relative importance or implicitly specifying the indicated technical features quantity. Therefore, the features defined with "first" and "second" may explicitly or implicitly include at least one of the features. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, and is not within the scope of protection required by the present application.

Figure 1:
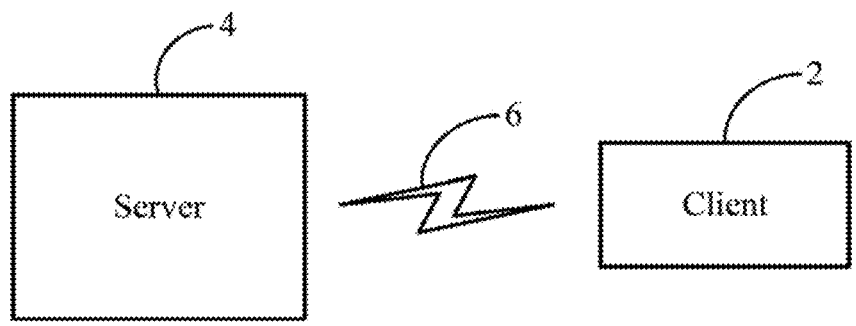
FIG. 1 is a diagram of application environment architecture for implementing various embodiments of the present application.

Referring to FIG. 1, FIG. 1 is a diagram of application environment architecture for implementing various embodiments of the present application. The present application can be applied to an application environment including, but not limited to, a client 2, a server 4, and a network 6.

Wherein, the client terminal 2 is used to receive data such as a video uploaded by a user and send the data to the server 4, obtain resources such as video data from the server 4 and play the video to the user, and receive user's operations and so on. In the embodiment of the present application, the client 2 is also used to receive viewfinder configuration information of the video uploaded by the user or receive the viewfinder configuration information of the video from the server 4, and push to the user according to the viewfinder configuration information when the video is played. The client 2 may be a terminal device such as a PC (Personal Computer), a mobile phone, a tablet computer, a portable computer, a wearable device and so on.

The server 4 is configured to receive data such as the video uploaded by the client 2 and provide resources such as video data to the client 2. In the embodiment of the present application, the server 4 is also configured to associate the viewfinder of the video, and send the viewfinder configuration information corresponding to the video to the client 2. The server 4 may be a computing device such as a rack server, a blade server, a tower server, or a cabinet server, and may be an independent server or a server cluster composed of a plurality of servers.

The network 6 can be an Intranet, an Internet, a Global System of Mobile communication (GSM), a Wideband Code Division Multiple Access (WCDMA), a 4G network, a 5G network, Bluetooth, Wi-Fi and other wireless or wired networks. The server 4 and one or more clients 2 are communicatively connected through the network 6 for data transmission and interaction.

First Embodiment

Figure 2:
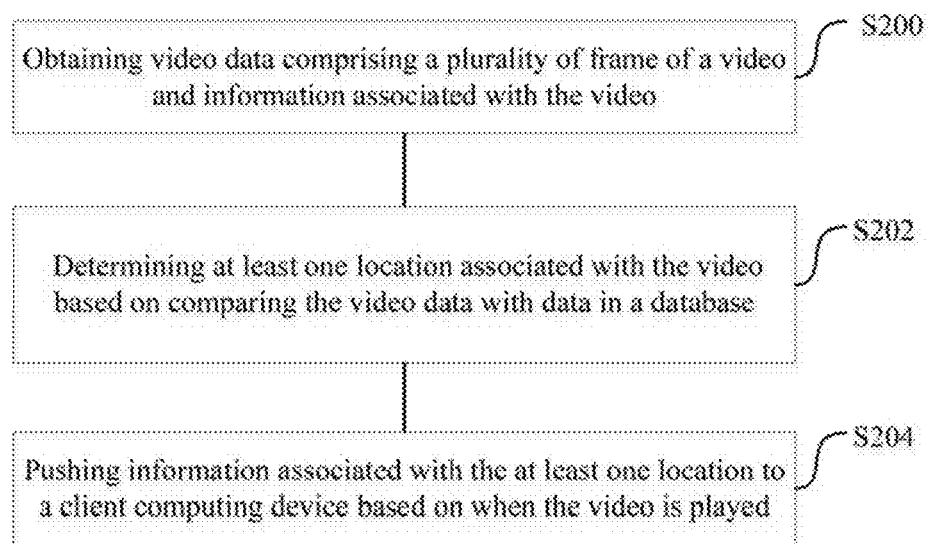
FIG. 2 is a flowchart of a method of pushing video viewfinder according to a first embodiment of the present application.

Referring to FIG. 2, FIG. 2 is a flowchart of a method of pushing video viewfinder proposed by the first embodiment of the present application. It can be understood that the flowchart in the method embodiment is not used to limit the execution order of the steps. In the embodiment, the server 4 is taken as the main execution subject for exemplary description.

The method includes the following steps:

S200, obtaining video data, the video data comprising a plurality of frame of a video and information associated with the video.

The user may upload the video through the client 2, and the video is sent to the server 4 by the client 2, and the user will provide a title, an introduction and others of the video when uploading a video feature film. In addition, during a process of playing the video, the viewer may leave a message in a bullet screen (which is the message that pops up when the video is played to a specific time) or a comment. The video data includes, but is not limited to, the video feature film, the title, the introduction, the bullet screen, and the comment. The server 4 obtains the video data and extracts various basic information of the video from the video data. In the embodiment, the basic information of the video may include the title, the introduction, diversity, and so on. In addition, the server 4 may extract the basic information of the video by means of data crawling from the public information of a video website.

S202, determining at least one location associated with at least one frame among the plurality of frames of the video based on comparing the video data with data included in a database, and configuring a viewfinder for the at least one location associated with the video.

The database includes, but is not limited to, travel columns, game columns, travel notes and other articles that may mention the viewfinder of a video work, and other related information that can mention the viewfinder of the video work. After extracting the basic information of the video, the basic information of the video (which is mainly the title here) and related vocabulary of the viewfinder (such as the "viewfinder", "shooting location", "holy land" and so on) are taken as a keyword and matched with the database, if the keyword is hit (that is, the article text in the database matches the basic information such as the title of the video, and matches the keyword such as the "viewfinder", the "shooting location", and the "holy land" at the same time), the viewfinder information corresponding to the video is obtained (that is, the video is found to have corresponding viewfinder information according to the database), and the video is configured with associated viewfinders according to a matching result. Wherein, viewfinder configuration information includes the pushing time points (which are used to push a video playing time point of the viewfinder to the user) and viewfinder information (which includes a viewfinder name, a viewfinder address, and a viewfinder introduction and so on) corresponding to each time point.

In the embodiment, the matching result and corresponding processing may include the following situations:

(1) If a key frame of the video can be matched according to an image of the viewfinder mentioned in the article text in the database, and viewfinder address information can be matched according to the article text in the database, transferring to manual review after the viewfinder configuration information is directly and intelligently configured;

(2) If the key frame can be matched but the viewfinder address information is not matched (for example, only the name of the viewfinder may be mentioned), the viewfinder information is manually configured after the pushing time points is marked;

(3) If the viewfinder is matched but the key frame is not matched, the video is regarded as a to-be-configured video and transferred to manual processing;

(4) if the viewfinder is not matched (the key frame is not hit), other default ways are used to calculate a probability of the viewfinder associated with the video, and the video whose probability reaches a preset threshold is taken as the to-be-configured video and transferred to the manual processing.

Figure 3:
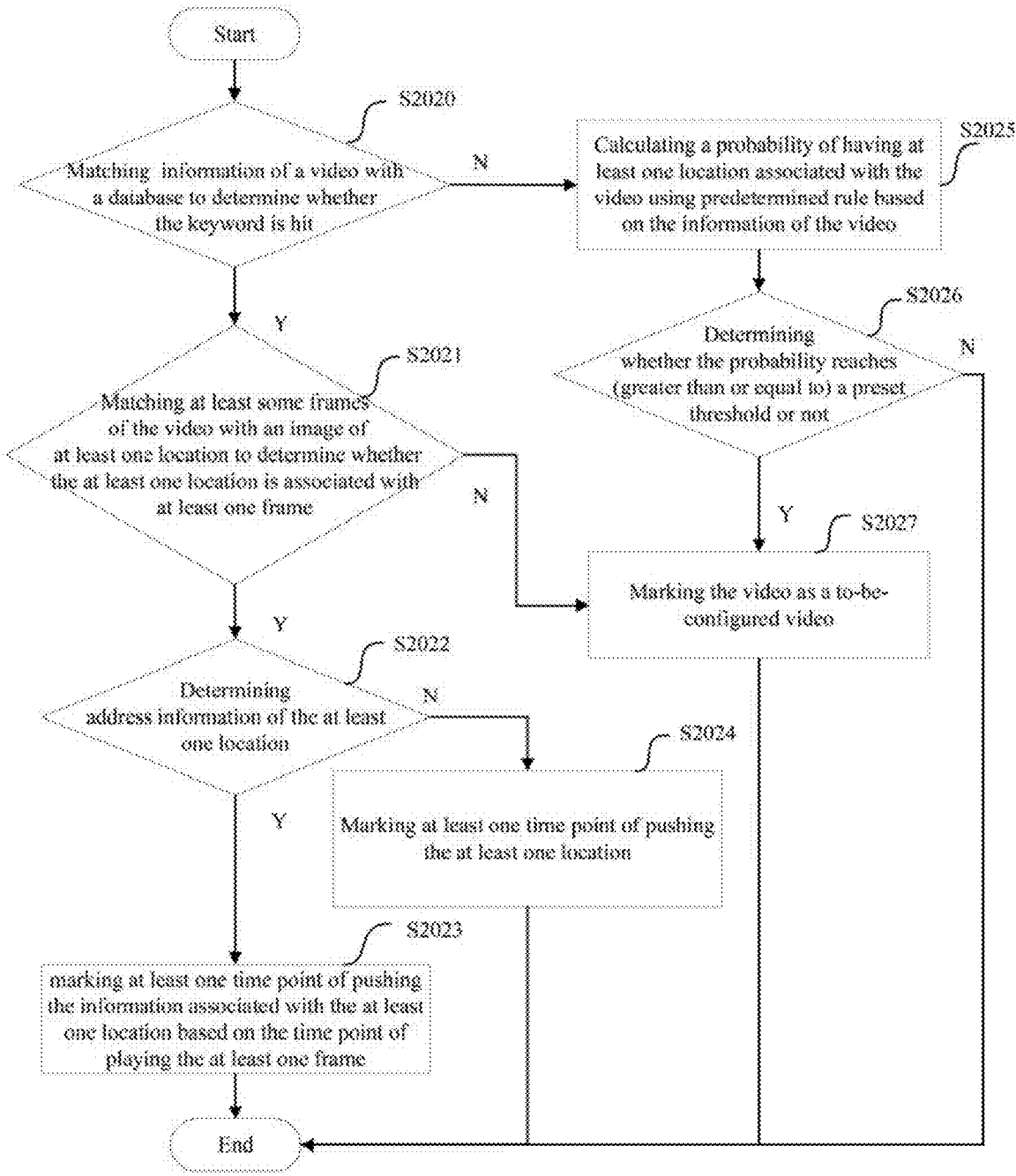
FIG. 3 is a detailed flowchart of step S202 in FIG. 2.

Specifically, further referring to FIG. 3, which is a detailed flowchart of the above step S202. It can be understood that the flowchart is not used to limit the execution order of the steps. According to requirements, some steps in the flowchart can also be added or deleted. In the embodiment, the step S202 specifically includes:

S2020, matching the basic information of the video with the database to determine whether the keyword is hit (that is, the article text in the database matches the basic information such as the title of the video, and matches the keyword such as the "viewfinder", the "shooting location", and the "holy land" at the same time). When the keyword is hit, it means that at least one location associated with the video is determined in the database, and step S2021 is executed; if the keyword is not hit, steps S2025-S2026 are executed.

S2021, matching at least some frames of the video with an image of the at least one location in the database to determine whether a key frame corresponding to the at least one location is matched or not, when the key frame corresponding to the at least one location is matched, step S2022 is executed; when the key frame corresponding to the at least one location is not matched, step S2027 is executed.

In the embodiment, after the at least one location associated with the video mentioned in the database is matched, matching the key frame is further performed. Under normal circumstances, if the at least one location of the video is mentioned in relevant columns and travel notes, there is a high probability that a screenshot (which is the screenshot when the viewfinder appears) of the video work and/or other related images such as field photography images of the viewfinder will be uploaded. Therefore, adopting the method of matching the image similarity, the matching object is the above-mentioned image and the key frame in the video, and the time points (that is, the pushing time points) at which information associated with the at least one location appears in the video can be determined. If the key frame corresponding to the at least one location can be matched, the video playing time point where the key frame is located is the time point of pushing the information associated with the at least one location.

It is worth noting that the embodiment can determine the key frame in the video using the following manner:

(1) Extracting the image at an equal time interval for the video as the key frame to match the image of the viewfinder. For example, the image is extracted every second, and the extracted image is taken as the key frame of the video.

In addition, when a mouse is hovered on a video progress bar of the web page, a static image at the moment is displayed. If the server 4 has saved the picture of the static image, the saved picture of the static image can be directly taken as the key frame to match the image of the viewfinder.

(2) Obtaining bullet screen information corresponding to the video, calculating a frequency of the key information (which is the keyword related to the viewfinder, such as the "viewfinder", the "shooting location", the "holy land", and "check-in" and so on) appearing in the bullet screen information in each unit time, determining whether the frequency reaches (greater than or equal to) the preset threshold or not, and taking the image of the video corresponding to the unit time whose frequency reaches the threshold as the key frame to match the image of the viewfinder.

S2022, determining whether the database contains address information of the at least one location associated with the video; when the database contains the address information, step S2023 is executed; when the database does not contain the address information, step S2024 is executed.

In the embodiment, after at least one location associated with the video is matched from the article text in the database (for example, the title of the video and the name of the viewfinder are mentioned in the text), whether address information of the at least one location is contained is further determined from the context of the article. The address information of the at least one location may be a text description or a map, and so on.

In other embodiments, after the name of the at least one location associated with the video is matched (or after the database does not contain the address information of the at least one location is determined), the address information of the at least one location can be automatically searched for from other channels (which include map applications, such as, Baidu Map, Amap, and so on) to perform intelligent configuration. If the address information of the at least one location is found, step S2023 is executed; otherwise, step S2024 is executed.

S2023, marking at least one time point of pushing the information associated with the at least one location based on a time point of playing the at least one frame, and configuring a viewfinder corresponding to the at least one location and including the at least one time point of pushing the information associated with the at least one location.

In the embodiment, according to the matched key frame corresponding to the viewfinder, the pushing time points of the viewfinder are marked on a time axis of the video, and the viewfinder information corresponding to the pushing time points is configured, the viewfinder information includes the name of the viewfinder, the address of the viewfinder and the introduction of the viewfinder and so on. After the configuration is completed, the configuration information of the viewfinder of the video is transferred to manual review to further confirm the accuracy of a configuration result.

S2024, marking at least one time point of pushing the at least one location in the video, and transferring to artificially improve the viewfinder information corresponding to the pushing time points.

In the embodiment, when the address information of the viewfinder cannot be obtained, the pushing time points of the viewfinder are marked on the time axis of the video according to the matched key frame corresponding to the viewfinder, the name of the viewfinder corresponding to the pushing time points is configured. Then, the configured information is transferred to manual processing, and the address information of the viewfinder is manually added to improve the configuration of the viewfinder information corresponding to the video.

S2025, calculating the probability of having at least one location associated with the video based on a predetermined rule based on the information associated with the video.

When at least one location associated with the video cannot be matched according to the database (the keyword is not hit), key information is extracted from the video data, the key information includes information appearing in the basic information of the video (for example, the name of a location appears in the introduction of the video) and the keyword related to the location contained in the bullet screen and/or comments of the video (such as the "viewfinder", the "shooting location", the "holy land", and "check-in" and so on). Then a probability of having at least one location associated with the video is calculated using a default way according to the key information. Wherein, the default way can be pre-setting a weight coefficient of each of the key information and calculating the probability according to the whether the key information and the weight coefficient occur or not.

For example, the weight coefficient corresponding to the place name appearing in the introduction of the video is set to be 0.2, and the weight coefficient corresponding to a density of the keyword appearing in the bullet screen is set to be 0.6. Then a calculation formula for calculating the probability of the viewfinder associated with the video is: the probability=whether the name of the viewfinder appears in the introduction of the video or not (0/1)*a first weight coefficient (such as 0.2)+density of the bullet screen*a second weight coefficient (such as 0.6). If the introduction of the video directly hit the place name (such as Guozheng Center), then 1 is taken, otherwise 0 is taken; a bullet screen list of the video is read, and the density of the keyword appearing in unit time (such as 3 seconds) is calculated, the density is the number of the hitting keywords divided by the total number of bullet screen per unit time. Then, the above value is substituted into the calculation formula to obtain the probability. Assuming that "Guozheng Center" appears in the introduction of the video, and the total number of the bullet screen during the playing time from 03:45 to 03:48 is 100, the number of the bullet screen containing the words "check-in" is 80, that is, the density is 0.8, then the probability is calculated to be 1×0.4+0.8×0.6=0.4+0.48=0.88.

It is worth noting that the probability calculated according to the density of the keyword appearing within the unit time in the bullet screen is the probability of there is a viewfinder associated with the video within the unit time. In other words, if it is subsequently determined that the video has the potential to have an associated viewfinder according to the probability, the pushing time points corresponding to the viewfinder may be configured as the unit time.

S2026, determining whether the probability reaches (greater than or equal to) the preset threshold or not. If the probability reaches the preset threshold, step S2027 is executed; if the probability does not reach the preset threshold, the process ends.

For example, if the preset threshold is set to be 0.5, and if the calculation result of the probability reaches 0.5, it is considered that the video has the potential of having the associated viewfinder. Otherwise, it is considered that the video does not have the potential of having the associated viewfinder, and the video and related data are discarded (which refers to no longer do other processing related to configure the viewfinder information).

S2027, marking the video as a to-be-configured video and transferring to artificially complete a configuration of the viewfinder of the video.

When the viewfinder of the video mentioned in the database is matched according to the hitting keyword, but the key frame corresponding to the viewfinder cannot be matched, or when the keyword is not hit, but the probability of the video has an associated viewfinder calculated reaches the preset threshold, the video is marked to be the to-be-configured video and transferred to manual processing with the matched name of the viewfinder (or the place name that appears in the introduction, and so on), and the pushing time point of the viewfinder is manually determined and the address information of the viewfinder is manually added to complete the configuration of the viewfinder of the video.

The present embodiment may, through the way of matching the basic information of the video with the database (which includes but not limited to column articles and travel articles), match and in some cases confirm the viewfinder where a specific segment of the video appears to realize automatic data association. In addition, the probability that the viewfinder appears in the video or its segment can also be calculated according to the key information in the video data, as a basis for regarding the video as the to-be-configured video, and then transferred to manual processing.

Returning to FIG. 2, step S204, pushing the information associated with the at least one location to a first computing device based on a time point of playing the at least one frame among the plurality of frames of the video.

Figure 4:
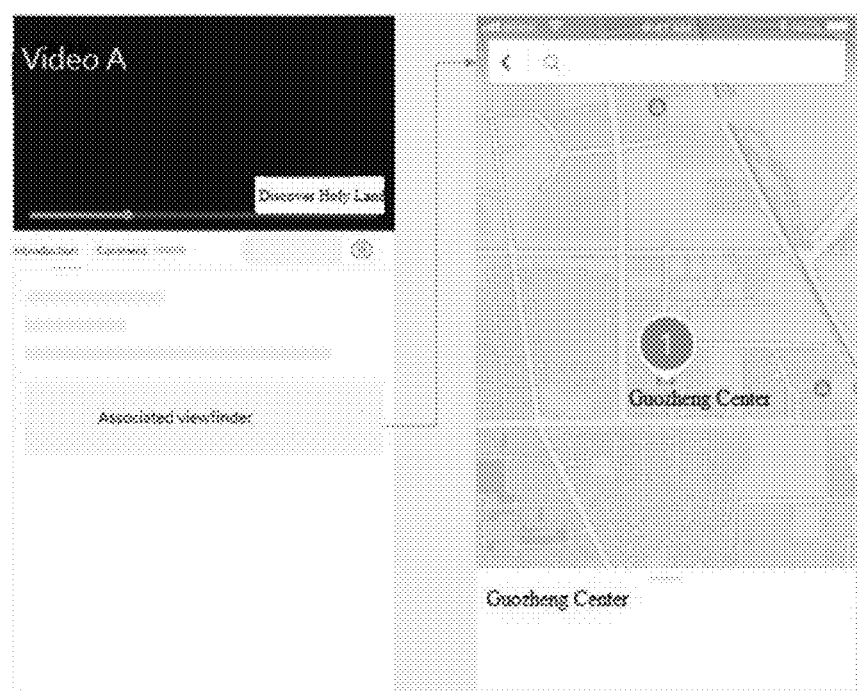
FIG. 4 is a schematic diagram of a pushing way in the present application.

When the video is played to the pushing time points, the viewfinder information corresponding to the pushing time points is obtained and pushed to the user (which can also be obtained a certain time in advance and pushed at the pushing time points). In the embodiment, the pushing method may be displayed to the user in the form of text description or map coordinates on the playing page of the video. An entry can be added to the video player page to display the viewfinder involved in the video, and the form includes but is not limited to: a detailed address descripted with text and the brief map coordinates; the entry is clicked on to enter a map page of a product, which can show the location of the viewfinder associated with the video in detail. For example, referring to FIG. 4, FIG. 4 is a schematic diagram of a pushing way. When the video is played to the pushing time points, a prompt of "Discover Holy Land" is displayed at the position of the pushing time point in the time axis or anywhere on the player interface or the current page, and the map coordinate of the viewfinder corresponding to the pushing time points is displayed in the video detail sections of the current page.

In the embodiment, except displaying the map coordinate of the viewfinder (which may be one or more) on the playing page of the video according to the address information of the viewfinder, a video icon corresponding to the coordinate of each viewfinder is displayed on the map page, when the user clicks on the video icon, the video or a video segment (containing the segment of the viewfinder) is played.

In other embodiments, the viewfinder information associated with the video may also be pushed to the user in other feasible ways, such as displaying a prompt bullet screen, voice prompt, or popping up a small display box at a specific location, which is not limited here.

In addition, when pushing the viewfinder associated with the video to the user, the viewfinder information pushed to the user and associated with the video can also be determined according to user information. Specifically, it may include: doing not push the viewfinder information to some users (for example, the users who have been set not to receive pushing notifications); pushing different types of viewfinder information according to users' personal attributes such as geographic locations, hobbies, and so on. Therefore, different pushes can be carried out for different users, which are more adapted to user's requirement and improving user's experience.

The viewfinder that appears in the film and television works can actually increase the offline passenger flow, and the embodiment can increase a conversion rate of "online discovering offline", that is, a clear and convenient path of positioning to the viewfinder contained in the video for video viewers is provided.

The method of pushing video viewfinder proposed by the embodiment of the present application can associate video works with actual viewfinders, and clearly mark the viewfinder information at a corresponding time point in a video playing page, so that the user can query related information, thereby increasing an online discovery rate of these offline viewfinders and improving user's experience.

Second Embodiment

Figure 5:
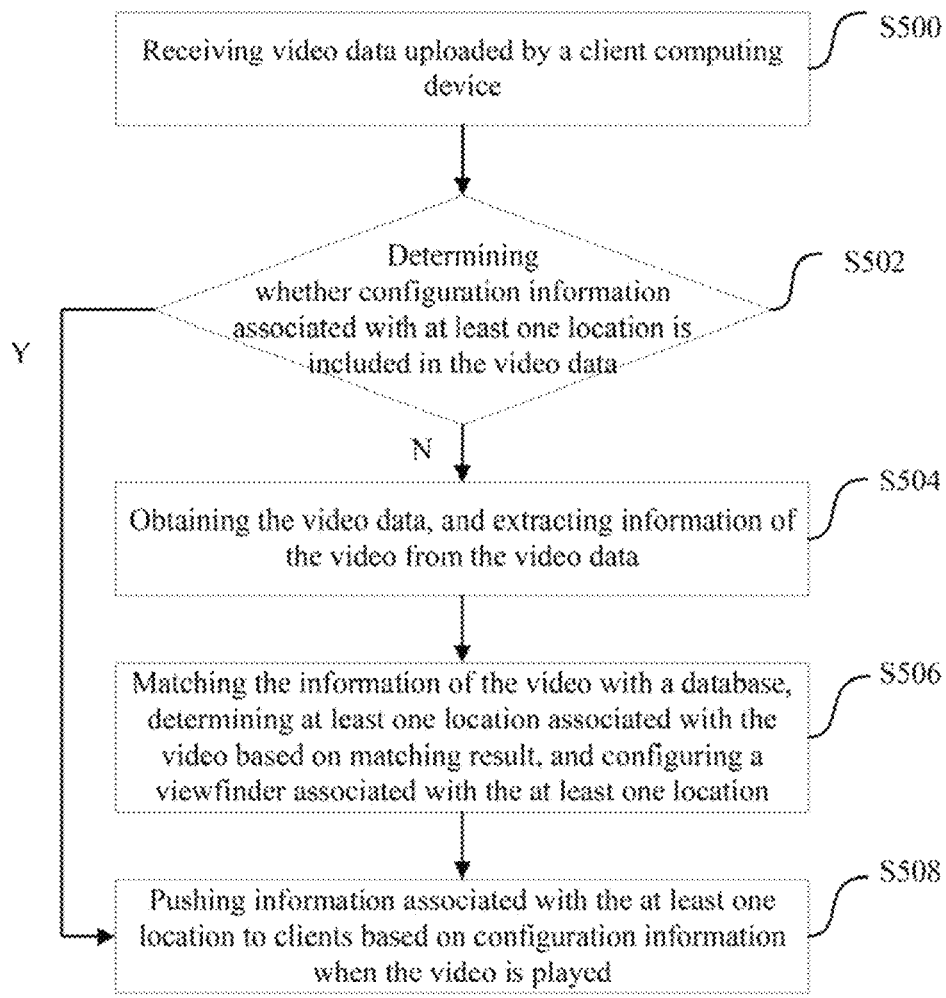
FIG. 5 is a flowchart of a method of pushing video viewfinder according to a second embodiment of the present application.

FIG. 5 is a flowchart of a method of pushing video viewfinder according to a second embodiment of the present application. In the second embodiment, on the basis of the above-mentioned first embodiment, the method of pushing video viewfinder further includes steps S500-S502. It can be understood that the flowchart in the method embodiment is not used to limit the execution order of the steps.

The method includes the following steps:

S500, Receiving video data uploaded by a client computing device.

The user may upload the video through the client 2 and the video can be sent to the server 4 by the client 2, and the user may provide the title, the introduction and others of the video when uploading the video feature film. In addition, when the user uploads the video, the viewfinder configuration information of the video can be uploaded together, that is, the pushing time points and viewfinder information (such as the name and detailed coordinates on the map of the viewfinder) are configured when uploading the video and its basic information by manual configuration. Then, the video does not need to perform the association operation of the viewfinder subsequently, and can directly push to the user when the video is played according to the uploaded viewfinder configuration information.

S502, determining whether viewfinder configuration information corresponding to at least one location has been included in the uploaded video data. When the viewfinder configuration information has been uploaded, step S508 is executed; when the viewfinder configuration information has not been uploaded, step S504 is executed.

Before performing the association operation of the viewfinder of the video, whether the viewfinder configuration information of the video has been uploaded or not is first determined. If the viewfinder configuration information has been uploaded, there is no need to perform subsequent operations, just being pushed directly; if the viewfinder configuration information has not been uploaded, it is necessary to associate the video with the corresponding viewfinder according to the database.

S504, obtaining the video data, and extracting the information of the video from the video data.

The title, the introduction and others of the video are provided when the user uploads the video. In addition, during process of playing the video, the viewers may leave the message in the bullet screen (which is the message that pops up when the video is played to the specific time) or the comment. The video data includes, but is not limited to, the video feature film, the title, the introduction, the bullet screen, and the comment. The server 4 obtains the video data and extracts various basic information of the video from the video data. In the embodiment, the basic information of the video may include title, introduction, diversity, and so on. In addition, the server 4 may extract the basic information of the video by means of data crawling from the public information of the video website.

S506, matching the information of the video with the database, determining the at least one location associated with the video according to the matched result, and configuring a viewfinder associated with the at least one location.

The database includes, but is not limited to, travel columns, game columns, travel notes and other articles that may mention the viewfinder of a video work, and other related information that can mention the viewfinder of the video work. After extracting the basic information of the video, the basic information of the video (which is mainly the title here) and related vocabulary of the viewfinder (such as the "viewfinder", "shooting location". "holy land" and so on) are taken as a keyword and matched with the database, if the keyword is hit (that is, the article text in the database matches the basic information such as the title of the video, and matches the keyword such as the "viewfinder", the "shooting location", and the "holy land" at the same time), the viewfinder information corresponding to the video is obtained (that is, the video is found to have corresponding viewfinder information according to the database), and the video is configured with an associated viewfinder according to a matching result. Wherein, viewfinder configuration information includes the pushing time points (which are used to push a video playing time point of the viewfinder to the user) and viewfinder information (which includes a viewfinder name, a viewfinder address, and a viewfinder introduction and so on) corresponding to each time point.

In the embodiment, the matching result and corresponding processing may include the following situations:

(1) If a key frame of the video can be matched according to an image of the viewfinder mentioned in the article text in the database, and viewfinder address information can be matched according to the article text in the database, transferring to manual review after the viewfinder configuration information is directly and intelligently configured;

(2) If the key frame can be matched but the viewfinder address information is not matched (for example, only the name of the viewfinder may be mentioned), the viewfinder information is manually configured after the pushing time points is marked;

(3) If the viewfinder is matched but the key frame is not matched, the video is regarded as a to-be-configured video and transferred to manual processing;

(4) If the viewfinder is not matched (the key frame is not hit), other default ways are used to calculate a probability of the viewfinder associated with the video, and the video whose probability reaches a preset threshold is taken as the to-be-configured video and transferred to the manual processing.

For the specific process of the step, refer to FIG. 3 and related descriptions, which will not be repeated hem.

S508, pushing the information associated with the at least one location to client computing devices based on the viewfinder configuration information when the video is played.

When the video is played to the pushing time points, the viewfinder information corresponding to the pushing time points is obtained and pushed to the user (which can also be obtained the certain time in advance and pushed at the pushing time points). In the embodiment, the pushing method may be displayed to the user in the form of text description or map coordinates on the playing page of the video. The entry can be added to the video player page to display the viewfinder involved in the video, and the form includes but is not limited to: the detailed address descripted with text and the brief map coordinates; the entry is clicked on to enter a map page of the product, which can show the location of the viewfinder associated with the video in detail. For example, referring to FIG. 4. FIG. 4 is the schematic diagram of a pushing way. When the video is played to the pushing time points, the prompt of "Discover Holy Land" is displayed at the position of the pushing time point in the time axis or anywhere on the player interface or the current page, and the map coordinate of the viewfinder corresponding to the pushing time points is displayed in the video detail sections of the current page.

In the embodiment, except displaying the map coordinate of the viewfinder (which may be one or more) on the playing page of the video according to the address information of the viewfinder, the video icon corresponding to the coordinate of each viewfinder is displayed on the map page, when the user clicks on the video icon the video or the video segment (containing the segment of the viewfinder) is played.

In other embodiments, the viewfinder information associated with the video may also be pushed to the user in other feasible ways, such as displaying the prompt bullet screen, voice prompt, or popping up the small display box at the specific location, which is not limited here.

In addition, when pushing the viewfinder associated with the video to the user, the viewfinder information pushed to the user and associated with the video can also be determined according to user information. Specifically, it may include: doing not push the viewfinder information to some users (for example, the users who have been set not to receive pushing notifications); pushing different types of viewfinder information according to users' personal attributes such as geographic locations, hobbies, and so on. Therefore, different pushes can be carried out for different users, which are more adapted to user's requirement and improving user's experience.

The method of pushing video viewfinder proposed by the embodiment of the present application can upload the viewfinder configuration information of the video while uploading the video feature film, so that the viewfinder can be directly pushed to the user when the video is played, which is convenient for the user to view relevant information.

Third Embodiment

Figure 6:
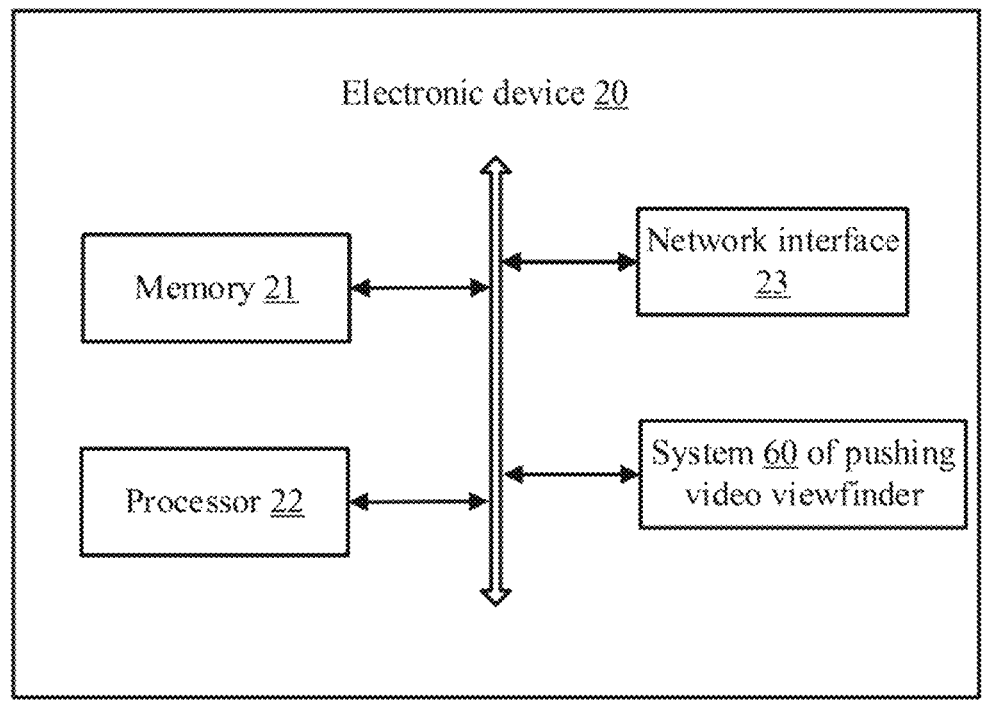
FIG. 6 is a schematic diagram of hardware architecture of an electronic device according to a third embodiment of the present application.

Referring to FIG. 6, FIG. 6 is a schematic diagram of hardware architecture of an electronic device 20 according to a third embodiment of the present application. In the embodiment, the device 20 includes, but is not limited to, a memory 21, a processor 22 and a network interface 23 that can be communicated with each other through a system bus. It should be pointed out that FIG. 6 only shows the electronic device 20 with components 21-23, but it should be understood that it is not required to implement all the illustrated components, and more or fewer components may be implemented instead. In the embodiment, the electronic device 20 may be the server 4.

The memory 21 includes at least one type of computer-readable storage medium. The readable storage medium includes a flash memory, a hard disk, a multimedia card, a card type memory (such as SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical dis and so on. In some embodiments, the memory 21 may be an internal storage module of the device 20 such as a hard disk or memory of the device 20. In other embodiments, the memory 21 may also be an external storage device of the device 20, such as a plugged hard disk provided in the device 20, a Smart Media Card (SMC), a Secure Digital (SD) card, a Flash card, and so on. Of course, the memory 21 may also include both an internal storage module and an external storage device of the device 20. In the embodiment, the memory 21 is generally used to store an operating system and various types of application software installed in the device 20 such as program codes of a system of pushing video viewfinder 60 and the like. In addition, the memory 21 may also be used to temporarily store various types of data that have been or will be outputted.

The processor 22, in some embodiments, may be a Central Processing Unit (CPU), a controller, a microprocessor, or other data processing chip. The processor 1120 is generally used to control the overall operation of the device 20. In the embodiment, the processor 22 is used to run program codes stored in the memory 21 or process data, such as run the system 60 of pushing video viewfinder and the like.

The network interface 23 may include a wireless network interface or a wired network interface which is generally used to establish a communication connection between the device 20 and other computer devices.

Fourth Embodiment

Figure 7:
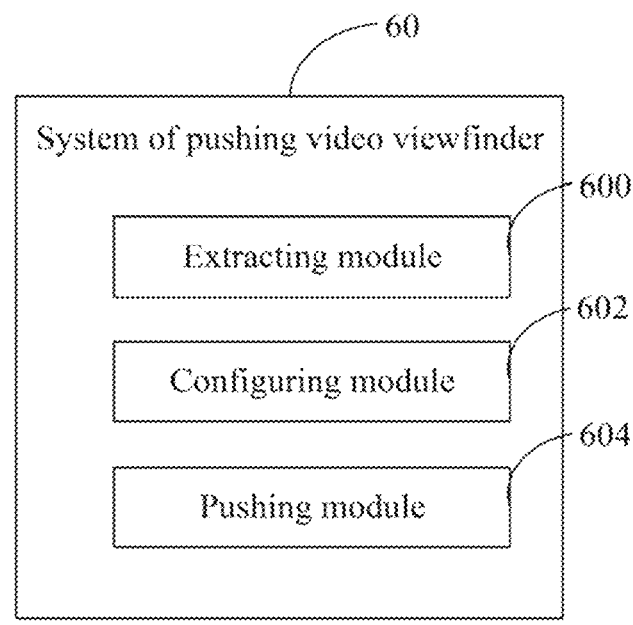
FIG. 7 is a module diagram of a system of pushing video viewfinder according to a fourth embodiment of the present application.

Referring to FIG. 7, which is a module diagram of a system 60 of pushing video viewfinder according to a fourth embodiment of the present application. The system 60 of pushing video viewfinder may be divided into one or more program modules, and the one or more program modules are stored in a storage medium and executed by one or more processors to complete the embodiments of the present application. The program module referred to in the embodiments of the present application refers to a series of computer program instruction segments that can complete specific functions. The following description will specifically introduce the functions of the program modules in the embodiment.

In the embodiment, the system 60 of pushing video viewfinder includes:

An extracting module 600, is for obtaining video data, and extracting basic information of a video from the video data.

The user may upload the video through the client 2, and the video is sent to the server 4 by the client 2, and the user will provide a title, an introduction and others of the video when uploading a video feature film. In addition, during a process of playing the video, the viewer may leave a message in a bullet screen (which is the message that pops up when the video is played to a specific time) or a comment. The video data includes, but is not limited to, the video feature film, the title, the introduction, the bullet screen, and the comment. The extracting module 600 obtains the video data and extracts various basic information of the video from the video data. In the embodiment, the basic information of the video may include the title, the introduction, diversity, and so on. In addition, the extracting module 600 may extract the basic information of the video by means of data crawling from the public information of a video website.

A configuring module 602, is for matching the basic information of the video with a database, determining a viewfinder associated with the video according to a matched result, and configuring the viewfinder associated with the video.

The database includes, but is not limited to, travel columns, game columns, travel notes and other articles that may mention the viewfinder of a video work, and other related information that can mention the viewfinder of the video work. After extracting the basic information of the video, the basic information of the video (which is mainly the title here) and related vocabulary of the viewfinder (such as the "viewfinder", the "shooting location", the "holy land" and so on) are used as a keyword and matched with the database, if the keyword is hit (that is, the article text in the database matches the basic information such as the title of the video, and matches the keyword such as the "viewfinder", the "shooting location", and the "holy land" at the same time), the viewfinder information corresponding to the video is obtained (that is, the video is found to have corresponding viewfinder information according to the database), and the video is configured with associated viewfinders according to a matching result. Wherein, viewfinder configuration information includes the pushing time points (which are used to push a video playing time point of the viewfinder to the user) and viewfinder information (which includes a viewfinder name, a viewfinder address, and a viewfinder introduction and so on) corresponding to each time point.

In the embodiment, the matching result and corresponding processing may include the following situations:

(1) If a key frame of the video can be matched according to an image of the viewfinder mentioned in the article text in the database, and viewfinder address information can be matched according to the article text in the database, transferring to manual review after the viewfinder configuration information is directly and intelligently configured;

(2) If the key frame can be matched but the viewfinder address information is not matched (for example, only the name of the viewfinder may be mentioned), the viewfinder information is manually configured after the pushing time points is marked;

(3) If the viewfinder is matched but the key frame is not matched, the video is regarded as a to-be-configured video and transferred to manual processing;

(4) If the viewfinder is not matched (the key frame is not hit), other default ways are used to calculate a probability of the viewfinder associated with the video, and the video whose probability reaches a preset threshold is taken as the to-be-configured video and transferred to the manual processing.

For the specific process of the configuring module 602, refer to FIG. 3 and related descriptions, which will not be repeated here.

A pushing module 604, is for pushing the viewfinder associated with the video to a user according to viewfinder configuration information of the video when the video is played.

When the video is played to the pushing time points, the viewfinder information corresponding to the pushing time points is obtained and pushed to the user (which can also be obtained a certain time in advance and pushed at the pushing time points). In the embodiment, the pushing method may be displayed to the user in the form of text description or map coordinates on the playing page of the video. An entry can be added to the video player page to display the viewfinder involved in the video, and the form includes but is not limited to: a detailed address descripted with text and the brief map coordinates; the entry is clicked on to enter a map page of a product, which can show the location of the viewfinder associated with the video in detail. For example, referring to FIG. 4, FIG. 4 is a schematic diagram of a pushing way. When the video is played to the pushing time points, a prompt of "Discover Holy land" is displayed at the position of the pushing time point in the time axis or anywhere on the player interface or the current page, and the map coordinate of the viewfinder corresponding to the pushing time points is displayed in the video detail sections of the current page.

In the embodiment, except displaying the map coordinate of the viewfinder (which may be one or more) on the playing page of the video according to the address information of the viewfinder, a video icon corresponding to the coordinate of each viewfinder is displayed on the map page, when the user clicks on the video icon the video or a video segment (containing segment of the viewfinder) is played.

In other embodiments, the viewfinder information associated with the video may also be pushed to the user in other feasible ways, such as displaying a prompt bullet screen, voice prompt, or popping up a small display box at a specific location, which is not limited here.

In addition, when pushing the viewfinder associated with the video to the user, the viewfinder information pushed to the user and associated with the video can also be determined according to user information. Specifically, it may include: doing not push the viewfinder information to some users (for example, the users who have been set not to receive pushing notifications); pushing different types of viewfinder information according to users' personal attributes such as geographic locations, hobbies, and so on. Therefore, different pushes can be carried out for different users, which are more adapted to user's requirement and improving user's experience.

The system of pushing video viewfinder proposed in the embodiment of the present application can associate video works with actual viewfinders, and clearly mark the viewfinder information at a corresponding time point in a video playing page, so that the user can query related information, thereby increasing an online discovery rate of these offline viewfinders and improving user's experience.

Fifth Embodiment

Figure 8:
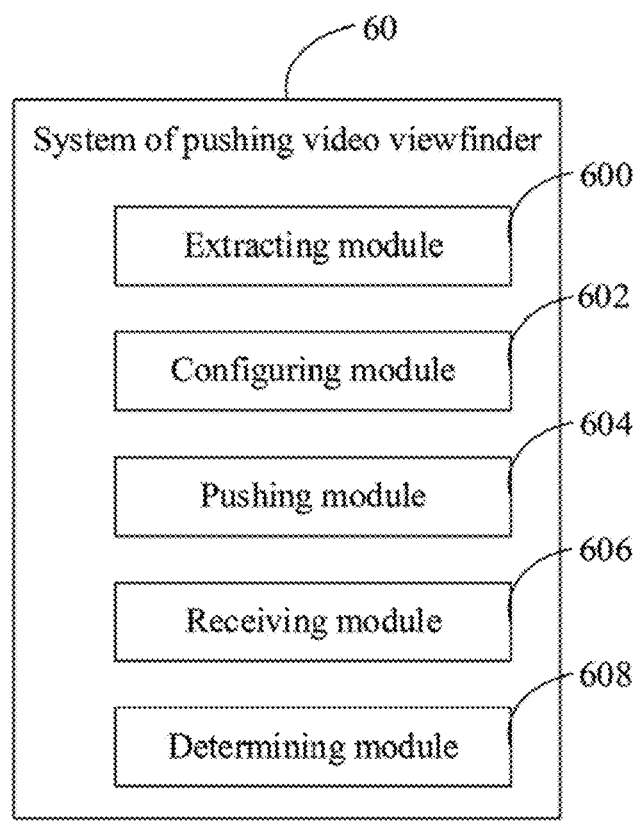
FIG. 8 is a module diagram of a system of pushing video viewfinder according to a fifth embodiment of the present application.

Referring to FIG. 8, is a module diagram of a system of pushing video viewfinder 60 according to a fifth embodiment of the present application. In the embodiment, the system 60 of pushing video viewfinder further includes a receiving module 606 and a determining module 608 except for the extracting module 600, the configuring module 602, and the pushing module 604 in the fourth embodiment.

The receiving module 606, is for receiving the video data uploaded by the user and the viewfinder configuration information of the video.

The user may upload the video through the client 2 and the video can be sent to the server 4 by the client 2, and the user may provide the title, the introduction and others of the video when uploading the video feature film. In addition, when the user uploads the video, the viewfinder configuration information of the video can be uploaded together, that is, the pushing time points and viewfinder information (such as the name and detailed coordinates on the map of the viewfinder) are configured when uploading the video and its basic information by manual configuration. Then, the video does not need to perform the association operation of the viewfinder subsequently, and can directly push to the user when the video is played according to the uploaded viewfinder configuration information.

The determining module 608, is for determining whether the viewfinder configuration information has been uploaded in the video or not. When the viewfinder configuration information has been uploaded, then the pushing module 604 is triggered to directly push to the user according to the uploaded viewfinder configuration information; when the viewfinder configuration information has not been uploaded, then the extracting module 600 is trigged for further processing.

A system of pushing at least one location associated with a video proposed by the embodiment of the present application can upload the viewfinder configuration information of the video while uploading the video feature film, so that the viewfinder can be directly pushed to the user when the video is played, which is convenient for the user to view relevant information.

Sixth Embodiment

The present application further provides another embodiment, that is a computer-readable medium is provided, which stores programs of pushing video viewfinder that can be executed by at least one processor to cause the at least one processor to implement steps of the method of pushing video viewfinder above.

It should be noted that in this article, the terms "including", "comprising" or any other variants thereof are intended to cover non-exclusive inclusion, so that a process, method, article or device including a series of elements not only includes those elements, also includes other elements not explicitly listed, or elements inherent to the process, the method, the article, or the device. If there are no more restrictions, the element defined by the sentence "including a . . . " does not exclude the existence of other same elements in the process, the method, the article or the device that includes the element.

The sequence numbers of the above embodiments of the present invention are for description only, and do not represent advantages and disadvantages of the embodiments.

Apparently, it should be appreciated by those skilled in the art that each module or each step described in the embodiment of the present application can be realized by a general-purpose and the modules or steps may be integrated on a single computer device or distributed on a network consisting of a plurality of computing devices, optionally, the modules or steps may be realized by executable program codes so that the modules or steps can be stored in a storage device to be executed by a computer device, and in some cases, the steps shown or described herein can be executed in a sequence different from this presented herein, or the modules or steps are formed into integrated circuit modules, or several of the modules or steps are formed into integrated circuit modules. Therefore, the embodiment of the present application is not limited to the combination of specific hardware and software.

The above are only preferred embodiments of the present application and do not limit the patent scope of embodiments of the present application. Any equivalent structure or equivalent process transformation made by the description and drawings of embodiments of the present application, or directly or indirectly used in other related technical fields, are as a same reason included in the scope of patent protection of embodiments of the present application.

What is claimed is:

1. A method, comprising:
    obtaining video data, wherein the video data comprise plurality frames of a video and information associated with the video;
    determining at least one location associated with at least one frame among the plurality of frames of the video based on comparing the video data with data included in a database;
    determining information associated with the at least one location;
    pushing the information associated with the at least one location to a first computing device based on a time point of playing the at least one frame among the plurality of frames of the video;
    wherein the method further comprises:
    determining whether a keyword is hit based on matching the information associated with the video with the data included in the database;
    determining a probability of having the at least one location associated with the video based on a predetermined rule and the information associated with the video in response to a determination that the keyword is not hit, wherein the predetermined rule comprises pre-establishing a weight coefficient corresponding to each piece of the information associated with the video; and
    determining whether the probability of having the at least one location associated with the video is greater than a threshold.

2. The method of claim 1, wherein the method comprises:
    determining that the keyword is hit based on matching the information associated with the video with the data included in the database; and
    determining the at least one frame based on matching at least some of the plurality frames with an image of the at least one location included in the database.

3. The method of claim 2, wherein the at least some of the plurality frames are extracted from the video at an equal time interval.

4. The method of claim 1, wherein the determining information associated with the at least one location further comprises determining address information of the at least one location.

5. The method of claim 1, further comprising:
    marking at least one time point of pushing the information associated with the at least one location based on the time point of playing the at least one frame among the plurality of frames of the video.

6. The method of claim 1, further comprising:
    determining whether the video data uploaded by a second client computing device comprise the information associated with the at least one location and information indicative of at least one time point of pushing the information associated with the at least one location.

7. The method of claim 1, wherein the pushing the information associated with the at least one location to a first computing device further comprises:
    sending the information associated with the at least one location to the first computing device for display of the information associated with the at least one location on an interface of playing the video.

8. The method of claim 1, wherein the pushing the information associated with the at least one location to a first computing device further comprises:
    sending the information associated with the at least one location to the first computing device for display of an indicator of the video at a position corresponding to a coordinate of the at least one location on a map, wherein at least a portion of the video is played when the indicator is selected based on user input.

9. A system, comprising:
    at least one processor; and
    at least one memory communicatively coupled to the at least one processor and storing instructions that upon execution by the at least one processor cause the system to perform operations comprising:
    obtaining video data, wherein the video data comprise a plurality frames of a video and information associated with the video;
    determining at least one location associated with at least one frame among the plurality of frames of the video based on comparing the video data with data included in a database;
    determining information associated with the at least one location;
    pushing the information associated with the at least one location to a first computing device based on a time point of playing the at least one frame among the plurality of frames of the video;
    wherein the operations further comprise:
    determining whether a keyword is hit based on matching the information associated with the video with the data included in the database;
    determining a probability of having the at least one location associated with the video based on a predetermined rule and the information associated with the video in response to a determination that the keyword is not hit, wherein the predetermined rule comprises pre-establishing a weight coefficient corresponding to each piece of the information associated with the video; and
    determining whether the probability of having the at least one location associated with the video is greater than a threshold.

10. The system of claim 9, wherein the operations further comprise:

determining that the keyword is hit based on matching the information associated with the video with the data included in the database; and determining the at least one frame based on matching at least some of the plurality frames with an image of the at least one location included in the database.

11. The system of claim 10, wherein the at least some of the plurality of frames are extracted from the video at an equal time interval.

12. The system of claim 9, wherein the determining information associated with the at least one location further comprises determining address information of the at least one location.

13. The system of claim 9, the operations further comprising:

marking at least one time point of pushing the information associated with the at least one location based on the time point of playing the at least one frame among the plurality of frames of the video.

14. The system of claim 9, the operations further comprising:

determining whether the video data uploaded by a second client computing device comprise the information associated with the at least one location and information indicative of at least one time point of pushing the information associated with the at least one location.

15. The system of claim 9, wherein the pushing the information associated with the at least one location to a first computing device further comprises:

sending the information associated with the at least one location to the first computing device for display of an indicator of the video at a position corresponding to a coordinate of the at least one location on a map, wherein at least a portion of the video is played when the indicator is selected based on user input.

16. A non-transitory computer-readable storage medium, storing computer-readable instructions that upon execution by a processor cause the processor to implement operations comprising:

obtaining video data, wherein the video data comprise a plurality frames of a video and information associated with the video;

determining at least one location associated with at least one frame among the plurality of frames of the video based on comparing the video data with data included in a database;

determining information associated with the at least one location;

pushing the information associated with the at least one location to a first computing device based on a time point of playing the at least one frame among the plurality of frames of the video;

wherein the operations further comprise:

determining whether a keyword is hit based on matching the information associated with the video with the data included in the database;

determining a probability of having the at least one location associated with the video based on a predetermined rule and the information associated with the video in response to a determination that the keyword is not hit, wherein the predetermined rule comprises pre-establishing a weight coefficient corresponding to each piece of the information associated with the video; and determining whether the probability of having the at least one location associated with the video is greater than a threshold.

17. The non-transitory computer-readable storage medium of claim 16, wherein the operations further comprise:

determining that the keyword is hit based on matching the information associated with the video with the data included in the database; and determining the at least one frame based on matching at least some of the plurality frames with an image of the at least one location included in the database.

18. The non-transitory computer-readable storage medium of claim 16, wherein the determining information associated with the at least one location further comprises determining address information of the at least one location.

* * * * *